United States Patent [19]
Keller et al.

[11] 3,740,155
[45] June 19, 1973

[54] COLORIMETER PROBE
[75] Inventors: Peter H. Keller; Roger D. Foskett, Waltham, Mass.
[73] Assignee: Syntex Corporation, Waltham, Mass.
[22] Filed: Apr. 1, 1971
[21] Appl. No.: 130,098

Related U.S. Application Data
[63] Continuation-in-part of Ser. No. 842,101, July 16, 1969, abandoned.

[52] U.S. Cl. ............... 356/180, 250/217, 356/188, 356/246
[51] Int. Cl. ........ G01j 3/46, G01n 1/10, G01j 3/48
[58] Field of Search .................. 356/208, 184, 188, 356/246, 244; 250/218

[56] References Cited
UNITED STATES PATENTS
3,068,739 12/1962 Hicks, Jr. et al................ 250/218 X
2,324,304 7/1943 Katzman............................ 356/208
3,164,663 1/1965 Gale............................... 250/218 X

*Primary Examiner*—Ronald L. Wibert
*Assistant Examiner*—Conrad Clark
*Attorney*—Wolf, Greenfield & Sacks

[57] ABSTRACT

A colorimeter probe includes a removable, disposable probe tip with a chamber formed at the outer end of the tip to receive the solution under investigation. In one embodiment of the invention, the probe is in the form of an elongated housing having a light source remote from the probe tip and directs light along a first path toward a reference photocell and simultaneously along another path which extends through the solution chamber and then to a signal cell. In another embodiment of the invention, the light source and sensors are remote from the probe and are optically connected to the probe by means of optical fibers.

10 Claims, 9 Drawing Figures

Patented June 19, 1973
3,740,155
2 Sheets-Sheet 1
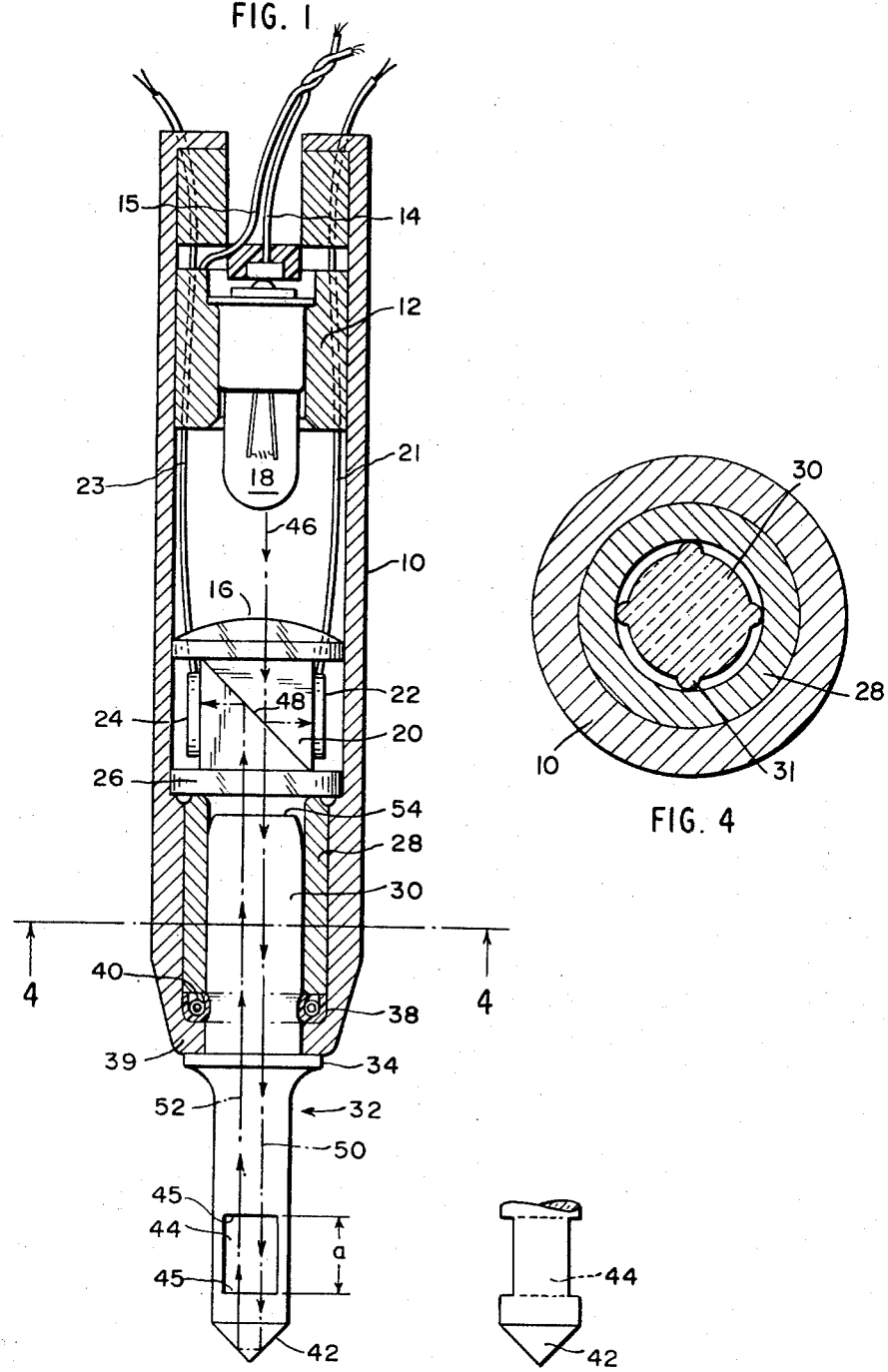
FIG. 1
FIG. 4
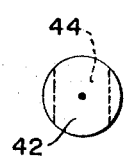
FIG. 3
FIG. 2
INVENTORS
ROGER FOSKETT
PETER H. KELLER
BY Wolf, Greenfield, Hieken & Sacks
ATTORNEYS Patented June 19, 1973

INVENTORS
Peter H. Keller +
Roger D. Foskett
BY
Wolf, Greenfield & Sacks
ATTORNEYS

COLORIMETER PROBE

This application is a Continuation in-part of Ser. No. 842,101 filed July 16, 1969, now abandoned.

BACKGROUND OF THE INVENTION

This invention relates to colorimeters and, more particularly, to a colorimeter probe which may be inserted in a test tube or other container holding the liquid under investigation.

There is at least one earlier probe colorimeter which enabled the user merely to immerse the probe in the solution to be tested. Such an instrument has many advantages over other prior art devices because of its convenience. It eliminates the use of special cuvettes, and measurements may be made at several times the rate possible with more conventional colorimeters. However, the earlier instrument of which applicants are aware has limited stability and requires cleaning after each use.

SUMMARY OF THE INVENTION

Each embodiment of the invention includes a light source and means for directing the light from the source along an optical path which passes through the chamber and the solution therein, and then to a signal cell. Means also are provided for establishing a reference signal with which the measured signal may be compared. In one embodiment of the invention, the light source comprises a lamp remote from the tip. A beam splitter interposed intermediate the lamp and tip causes the light from the lamp to split into two paths, one path going to the reference cell to establish the reference signal and the other path leading from the light source through the chamber to the tip and back again through the chamber to a signal cell to establish a measured signal to compare with the reference.

In another embodiment, the lamp is remote from the probe and the light is directed to and from the probe by means of flexible optical fibers which extend from the lamp to the probe and from the probe to the signal cell. In this embodiment, the reference cell is exposed directly to the lamp. Each embodiment of the invention also includes a removable inexpensive probe tip which is suitable for a single, disposable for a single, disposable use. In each embodiment of the invention the output from the signal cell is synchronously coupled as to be out of phase with the ambient light and, in particular, with ambient electric lighting. This includes an arrangement for inverting the phase of the light source and the signal cell in relation to the phase of the available power source to modulate the signals in the circuit and avoid the effects of unwanted signals from ambient sources.

An object of this invention is to increase the stability of colorimeters of the probe-type and eliminate the need for cleaning after each use. More particularly, an object of this invention is to provide a colorimeter probe with a disposable tip so that the requirement for cleaning may be eliminated.

Another object of this invention is to provide a colorimeter probe which can monitor flowing solutions or concentrations in a tank.

DESCRIPTION OF THE DRAWINGS

The foregoing objects and advantages of the invention will be understood more fully from the following detailed description thereof, with reference to the accompanying drawings wherein:

FIG. 1 is a cross sectional view of a colorimeter probe constructed in accordance with this invention;

FIG. 2 is a bottom end view thereof;

FIG. 3 is a fragmentary side view of the tip;

FIG. 4 is a cross sectional view taken along the section line 4—4 of FIG. 1;

DESCRIPTION OF THE PREFERRED EMBODIMENTS

Figure 5:
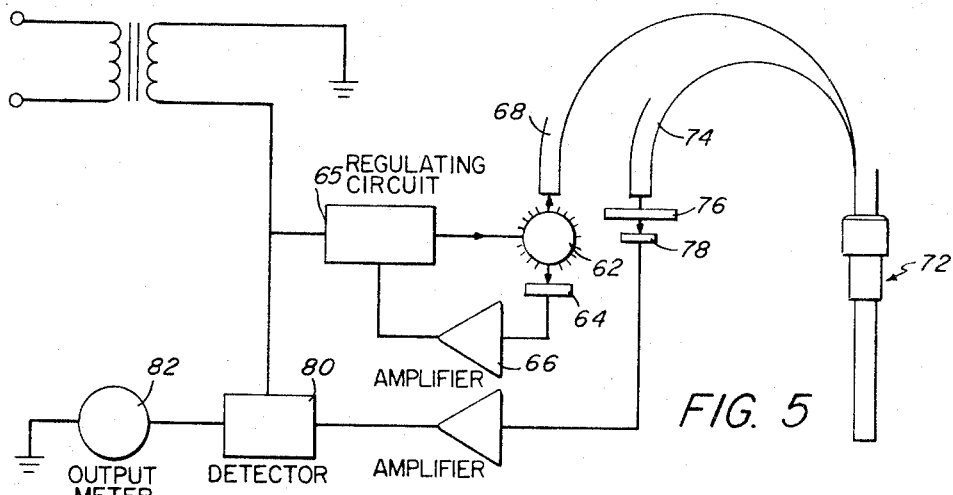
FIG. 5 is a schematic illustration of the circuitry associated with the invention.

One embodiment of the colorimeter probe is shown in FIGS. 1–4 and has a housing 10 which is generally cylindrical in shape and may be parted on a longitudinal center line (not shown) for assembly, or it may be assembled in some other convenient means. The housing 10 carries a lamp socket 12 adjacent one end powered from a regular AC outlet, and a cord 13 is provided for that purpose. In the drawing one side 14 of the line is connected to the center contact and the other side 15 to the socket body. The housing may include a cap for closing the rear end.

A collimator lens 16 is positioned in the housing 10 adjacent the lamp 18 carried in the socket 12, and a beam splitter 20 is shown in the housing adjacent the lens. The beam splitter 20 carries a pair of cells 22 and 24, one of which is used to establish a reference signal while the other provides a measured signal of the transmission through the solution being measured. In the embodiment shown, the cell 22 provides the reference signal while the cell 24 proves the measured signal. Conductors 21 and 23 extend rearwardly from the cells out the rear end of the housing.

Disposed beneath the beam splitter in the embodiment illustrated is a removable filter 26 which may be changed. The appropriate filter is selected and placed in the casing for any particular application. The filter 26 alternatively could be placed between the lens 16 and lamp 18.

A sleeve 28 is mounted in the lower end of the housing 10 and is sized to receive the end 30 of a replaceable tip 32. The tip 32 includes a flange 34 and an immersible end 36. Preferably, the tip 32 is disposable so that when a number of tests are being conducted the user may merely insert a tip and then discard it after a single use without washing it.

A Teflon seal 38 is shown provided adjacent the lower end of the sleeve 28, and the seal may be spring loaded by a coil spring as suggested at 40 so that it securely engages the end 30 of the probe to hold it in place when it is mounted as shown. The flange 34 which forms part of the probe limits the insertion of the end 30 into the sleeve 28 by engaging the end 39 of the housing 10 and further serves to align the tip axially with the other parts of the assembly. Preferably the end 30 is provided with ribs 31 that extend longitudinally in the sleeve 28 and engage the inner surface as shown in FIG. 4. The ribs 31 reduce the size of the tip and the weight of the assembly and fit snugly in the sleeve to releasably hold it in position.

The extreme lower end 42 of the tip is provided with a 45° cone-shaped configuration so that a beam of light which impinges upon it is reflected back to the beam splitter 20. While the end 42 is described as being cone-shaped, it will be appreciated that it may just as well be pyramid shaped to perform the same function.

A hole 44 is formed in the end 36 of tip 32, which hole may fill with the solution being tested. Because the hole of chamber 44 extends completely through the tip end, it will be appreciated that it may be immersed in a moving fluid and monitor it without interfering with the fluid flow.

As shown in FIG. 1, the light beam eminating from the lamp 18 is suggested by the multi-arrowed broken line 46. The light passes through the lens 16 and is directed along a path to the beam splitter 20. The interface 48 of the beam splitter is appropriately coated so as to direct part of the light to the reference cell 22. However, a portion of the light is allowed to pass through the interface 48, and the beam which passes through it in turn is directed through the filter 26 and axially along the probe tip 32 through the hole 44 which is use is filled with the solution being tested. The beam 50 which passes through the beam splitter 20 and downwardly through the chamber 44 to the end 42, is reversed by the cone-shaped end 42 so as to return the beam as suggested at 52 along a path so that it again intersects the hole 44. Thus the light beam which passes through interface 48 travels through the chamber 44 twice, a distance 2a, and the interface 48 appropriately coated turns that beam to the signal cell 24.

Because the beam which produces the signal is directed through the solution twice, the sensitivity of the colorimeter is increased, effectively double what it would be if it passed through the solution only once. The fact that the chamber 44 comprises a hole through the tip, allows the probe to monitor a flowing solution without interfering with the flow.

As still another advantage of this invention, the tip 32 may be inexpensively formed from a transparent plastic or similar material, such as styrene or plexiglas and so long as its end 42 as well as its inner end 54 and the faces 45 are formed to allow the light to enter the probe and travel up and down its length, it will adequately serve its function. It will be appreciated that the end 54 and the faces 45 of the tip must be perpendicular to the light beam paths 50 and 52 to cause the beam to follow the paths illustrated.

The colorimeter in accordance with this invention simultaneously produces a reference signal and a measured signal so that the colorimeter measurement may be conducted very rapidly. The output may be either in the form of an optical density measurement, or it may be in the form of a per cent transmittance. The signals from the cells may be carried by the conductors 21 and 23 to an amplifier and meter to display the measurement.

FIGS. 6 to 9 show another embodiment of the invention in which the light source, filter, reference and signal cells and all electronics are completely remote from the probe. In this embodiment, the electronic circuitry may be contained within a housing 60 together with the lamp 62. The light emitted from the lamp 62 impinges directly on a reference sensing cell 64, the output of the cell 64 being fed into an amplifier 66 in the manner shown in FIG. 5. The output from the amplifier is fed into a regulating circuit 65 which, in turn, controls the voltage applied to the lamp 62. This arrangement is effective to control accurately the output of the lamp 62 and maintain a steady and stable illumination source. The light from the lamp 62 also is simultaneously directed toward one end of a fiber optic cable 68 which may be connected conveniently through an appropriate fitting to the housing 60 in exposure to the lamp 62. The other end of the fiber optic cable 68 is connected, as described below, to the probe. The probe 72 also is connected to an output fiber optic cable 74, as described herein which transmits the output light through an appropriate filter 76 and toward the signal sensing cell 78. The signal sensing cell 78 also is mounted within the housing 60 and the end of the output cable 74 is connectable to the housing 60 to register the output end of the cable 74 with the filter 76 and signal cell 78. The output from the signal cell is amplified and connected to a synchronous detector 80, the output of which is passed through an output meter 82 calibrated to read in the desired parameter.

In the preferred embodiment of the invention the electronic circuitry is designed to minimize the effects of any ambient or stray light. This enables the colorimeter probe to be used in conventional ambient light environments and eliminates the heretofore preferred practice of conducting the tests in subdued light or, in some instances, total darkness. This is achieved by selecting a lamp regulator, according to well-known design, to shift the phase of the voltage applied to the lamp 90° in relation to the voltage applied to the ambient artificial lighting, such as fluorescent or incandescent lights. Additionally, the synchronous detector 80 is operated in phase with the regulator circuit 65 to nullify the effect of ambient, out of phase light. Thus, the signal cell is responsive primarily to phased light emitted by the lamp. In addition, the signal cell is AC coupled through a capacitor to filter out any unwanted DC signals.

Figure 6:
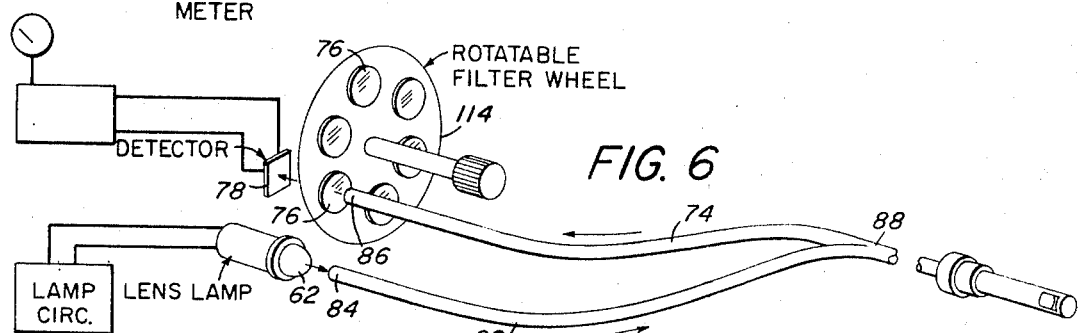
FIG. 6 is a somewhat diagramatic illustration of the fiber optic and filter arrangement as employed in the modified version of the invention.
Figure 9:
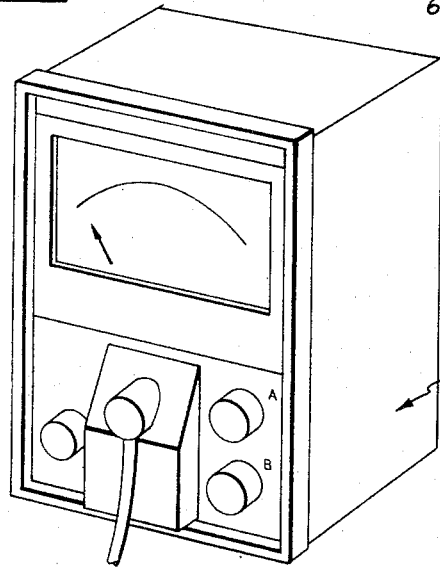
FIG. 9 is an illustration of a typical housing which encloses the electronic circuitry for the device.
Figure 7:
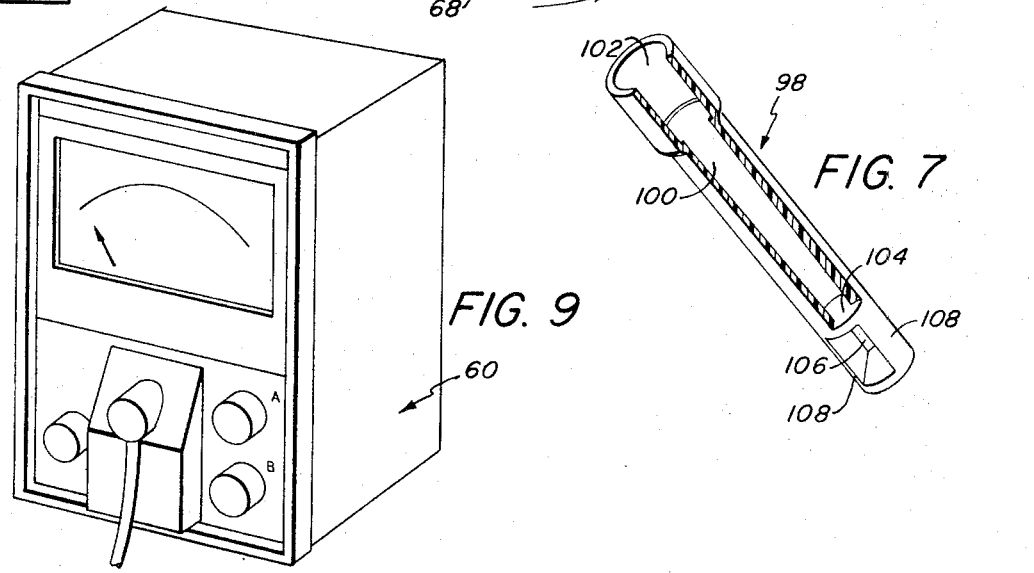
FIG. 7 is a cut-away illustration of the disposable probe tip.
Figure 8:
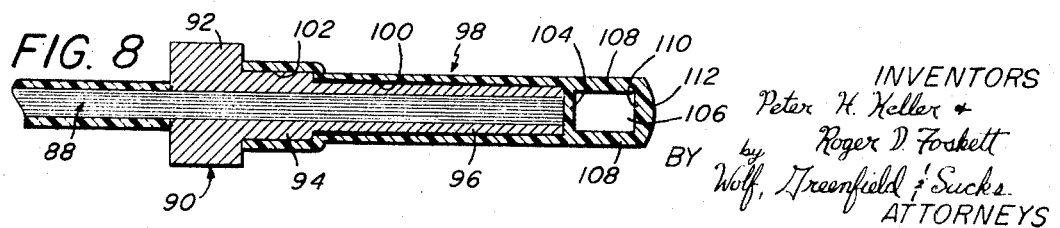
FIG. 8 is a sectional illustration of the assembled probe support and probe tip.

FIGS. 6, 7 and 8 show the construction of the optical fiber and probe arrangement in greater detail. The cables 68, 74 each comprise a plurality of conventional light transmitting optical fibers, which may be fabricated from glass or plastic. The free ends 84, 86 of the cables are intended to be connected to the housing 60 in alignment with the lamp 62 and the filter 76-sensor 78 arrangement. Each of the cables 68, 74 are encased in a flexible plastic sheath and are joined in a common bundle 88. The fibrous bundle leads into a probe support 90 which is secured to and about the outer ends of the fibrous bundle 88. The probe support 90 may be fabricated from an appropriate metal, such as stainless steel, and has a hollow central passage through which the bundle passes so that the outermost tip of the bundle is exposed at the outer end of the probe support. The probe support preferably includes an enlarged knurled collar 92 to facilitate its manipulation. The end of the probe support outermost of the knurled collar includes an intermediate collar 94 and an elongated tip 96. As shown in FIG. 8, the disposable probe 98 is intended to be sliped over the end of the probe support 90 in a snug but manually separable fit.

The disposable probe tip has an axial bore 100 formed therethrough to receive the end of the probe support. The receptive end of the bore 100 is provided with an enlarged portion 102 to receive the intermediate collar 94 of the probe support 90. In the preferred embodiment, both the outer end 96 of the probe support and the elongate bore 100 are provided with a slight taper to facilitate the desired snug fit between the support and the probe. The inner end of the axial bore 100 terminates in a bulkhead 104 which is optically transparent as is the complete probe tip. The extreme outermost end of the probe tip 98 which extends outwardly beyond the bulkhead 104 is formed to define the transversely open chamber 106 which is also defined by the spaced sidewalls 108 and an end wall 110. The outermost surface 112 of the end wall be spherical and is coated with an appropriate reflective material such as an aluminum film.

When the probe tip 98 is slipped over the probe support 90, the light is transmitted from the fibers in the cable 68, through the probe support 90, the bulkhead 104 and through the chamber 106 which contains the liquid under investigation. The light then is reflected from the coated outer surface 112 of the reflector 110 and then is redirected again through the liquid in the chamber 106 and the bulkhead 104 where it enters the fibers in the cable 74.

As shown somewhat diagramatically in FIG. 6 the device includes an arrangement for varying the particular filter between the output end of the fiber optic cable 74 and the light sensor 78. This arrangement includes a filter wheel 114 which is rotatably mounted within the housing 60. The filter wheel includes a number of filters 76 having different characteristics suitable for a variety of tests. The selected filter may be rotated into position by a simple manipulation of the control knob which is exposed at the face of the housing.

The foregoing embodiment is used in generally the same manner as the first described embodiment in that the probe tip may be disposed of after a single use. The probe tip is dimensioned to fit within test tubes of conventional configuration. Moreover, the probe tip is of simplified construction in that the light source, sensing devices, filters and electrical elements all are located remote from the probe.

It should be understood, that the foregoing description of the invention is intended merely to be illustrative thereof and that other embodiments and modifications may be apparent to those skilled in the art without departing from its spirit.

Having thus described the invention what we desire to claim and secure by Letters Patent is:

1. A colorimeter probe comprising,
a housing,
a lamp mounted in the housing,
a pair of photocells mounted in the housing, one of said photocells being a reference cell and the other being a signal cell,
means defining a pair of optical paths from said lamp, each of said paths terminating at one of said photocells,
a probe tip adapted to be inserted in a solution to be tested, said probe tip being disposed along the one of said optical paths which terminates at said signal photocell,
said probe tip being formed from a unitary piece of light-transmitting material and having a chamber therein disposed along the optical path extending therethrough,
means for applying an AC voltage to said lamp,
circuit means for shifting the phase of the applied voltage to said lamp to a phase different from that applied to ambient artificial lighting,
detecting circuit means connected to said signal cell for detecting the output of said signal cell, said detection circuit means including circuit means for detecting the output of said signal cell synchronously with the voltage applied to said lamp whereby the effects of ambient light may be minimized.

2. A colorimeter probe as defined in claim 1 wherein said housing comprises a casing, and further comprising,
said tip being detachably mounted to the end of said casing by means comprising a socket formed in said end of said casing, said tip being removably mounted in said socket to enable said tip to be replaced without removing any of the other components of said colorimeter.

3. A colorimeter probe as defined in claim 1 wherein said means defining one of said light paths comprises at least two flexible light transmitting cables extending from said housing, one of said cables being mounted to said housing in alignment with said light source and the other of said cables being mounted to said housing in alignment with said signal sensor.

4. A colorimeter probe comprising,
a housing,
a lamp mounted in the housing,
a pair of photocells mounted in the housing, one of said photocells being a reference cell and the other being a signal cell,
means defining a pair of optical paths from said lamp, each of said paths terminating at one of said photocells,
a probe tip adapted to be inserted in a solution to be tested, said probe tip being disposed along the one of said optical paths which terminates at said signal photocell,
said probe tip being formed from a unitary piece of light-transmitting material and having a chamber therein disposed along the optical path extending therethrough,
said means defining one of said optical paths comprising at least two flexible light transmitting cables extending from said housing,
one of said cables being mounted to said housing in alignment with said light source and the other of said cables being mounted to said housing in alignment with said signal cell,
means for detachably connecting the outer ends of said cables to said probe tip,
said means for detachably connecting the outer ends of said cable comprising,
an elongate probe support secured to the ends of said cables,
said probe tip being elongate and having a longitudinal bore opened at one end, said bore being receptive to the end of said elongate probe to cause said probe tip to cover a substantial portion of said probe support, said probe tip having a chamber formed therein outwardly beyond the end of said probe support, and light reflecting means at the outermost end of said probe tip to reflect light emitted from one of said cables back toward the other of said cables.

5. A colorimeter probe as defined in claim 4 further comprising, a filter assembly, including a plurality of filters, between the end of said other cable and said signal cell, said filter assembly being disposed within said housing, and control means on said housing for selectively moving one of said filters into a position between said other cable and said signal cell.

6. A colorimeter probe as defined in claim 4 further comprising, means for applying an AC voltage to said lamp, circuit means for shifting the phase of the applied voltage to said lamp to a phase different from that applied to ambient artificial lighting, detecting circuit means connected to said signal cell for detecting the output of said signal cell, said detection circuit means including circuit means for detecting the output of said signal cell synchronously with the voltage applied to said lamp whereby the effects of ambient light may be minimized.

7. A colorimeter probe comprising, a housing, a lamp mounted in the housing, a pair of photocells mounted in the housing, one of said photocells being a reference cell and the other being a signal cell, means defining a pair of optical paths from said lamp, each of said paths terminating at one of said photocells, a probe tip adapted to be inserted in a solution to be tested, said probe tip being disposed along the one of said optical paths which terminates at said signal photocell, said probe tip being formed from a unitary piece of light-transmitting material and having a chamber therein disposed along the optical path extending therethrough, said housing comprising a casing, said tip being detachably mounted to the end of said casing by means comprising a socket formed in the end of said casing, said tip being removably mounted in said socket to enable said tip to be replaced without removing any of the other components of said colorimeter, said means mounting said probe tip within said socket comprising a resilient ring retained within said socket and partially extending radially and inwardly into said socket, said probe tip having an inner end adapted to be inserted into said socket, said inner end being formed with an annular groove engageable with said resilient ring to detachably grip said resilient ring and to effect a seal between said socket and said casing and said probe tip.

8. A colorimeter probe as defined in claim 7 further comprises, said inner end of said probe tip being formed with raised longitudinal ribs for engagement with the inner surface of said socket.

9. A colorimeter probe as defined in claim 7 wherein said housing comprises an elongated casing, said probe tip being mounted at one end of said casing, said lamp being located at the other end of said casing and said photocells being disposed between the ends thereof and wherein said means defining said two optical paths comprises, a beam splitter interposed between said lamp and said probe tip, said beam splitter being arranged to direct a portion of the light beam from said lamp directly to the reference cell and the remaining portion of said light beam to the probe tip, said probe tip including a light reflective surface formed integrally therewith at its extreme end for returning said other of said beams through the chamber to the beam splitter and then to the signal cell.

10. A colorimeter probe as defined in claim 7 further comprising, means for applying an AC voltage to said lamp, circuit means for shifting the phase of the applied voltage to said lamp to a phase different from that applied to ambient artificial lighting, detecting circuit means connected to said signal cell for detecting the output of said signal cell, said detection circuit means including circuit means for detecting the output of said signal cell synchronously with the voltage applied to said lamp whereby the effects of ambient light may be minimized.

* * * * *

UNITED STATES PATENT OFFICE
CERTIFICATE OF CORRECTION

Patent No. 3,740,155　　　　　　　　　Dated June 19, 1973

Inventor(s)　Peter H. Keller et al.

It is certified that error appears in the above-identified patent and that said Letters Patent are hereby corrected as shown below:

On the cover sheet [73] "Syntex Corporation, Waltham, Mass." should read -- Syntech Corporation, Waltham, Mass. --. Column 1, line 48, cancel "disposable for a single,".

Signed and sealed this 1st day of January 1974.

(SEAL)
Attest:

EDWARD M. FLETCHER, JR.　　　　　　RENE D. TEGTMEYER
Attesting Officer　　　　　　　　　　Acting Commissioner of Patents